(12) United States Patent
Ono et al.

(10) Patent No.: US 6,378,637 B1
(45) Date of Patent: Apr. 30, 2002

(54) FUEL-CELL-POWERED ELECTRIC AUTOMOBILE

(75) Inventors: Tohru Ono; Yozo Kami; Norio Igarashi; Takeshi Ushio; Koji Gouhara, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/579,611

(22) Filed: May 26, 2000

(30) Foreign Application Priority Data

May 28, 1999 (JP) .......................... 11-150307
Aug. 6, 1999 (JP) .......................... 11-224665

(51) Int. Cl.$^7$ .............................................. B60K 6/00
(52) U.S. Cl. ...................................... 180/65.3; 180/68.5
(58) Field of Search ........................... 180/65.1, 65.3, 180/65.8, 68.4, 868.5

(56) References Cited

U.S. PATENT DOCUMENTS

| | | | | |
|---|---|---|---|---|
| 5,193,635 A | * | 3/1993 | Mizuno et al. ............ | 180/65.3 |
| 5,641,031 A | | 6/1997 | Riemer et al. | |
| 5,662,184 A | * | 9/1997 | Riemer et al. ............ | 180/65.1 |
| 5,858,568 A | * | 1/1999 | Hsu et al. ................. | 180/65.3 |
| 5,964,309 A | | 10/1999 | Kimura et al. | |
| 6,073,712 A | * | 6/2000 | Buglione | |
| 6,086,166 A | * | 7/2000 | Fukasawa | |
| 6,186,253 B1 | * | 2/2001 | Barnhart et al. ........... | 180/65.3 |
| 6,223,843 B1 | * | 5/2001 | O'Connell ................. | 180/65.3 |
| 6,237,709 B1 | * | 5/2001 | Chubachi .................. | 180/65.3 |

FOREIGN PATENT DOCUMENTS

| | | |
|---|---|---|
| DE | 4412450 | 10/1995 |
| DE | 19732117 | 1/1998 |
| JP | 3-109126 | 9/1989 |

OTHER PUBLICATIONS

German Search Report, Jan. 23, 2001.
NECAR4—Die Alternative, DaimlerChrysler, Stuttgart, 13 pages, Mar. 1999.

* cited by examiner

*Primary Examiner*—J. J. Swann
*Assistant Examiner*—Christopher Bottorff
(74) *Attorney, Agent, or Firm*—Merchant & Gould, P.C.

(57) ABSTRACT

An electric automobile having a fuel cell system. A fuel tank, a fuel reformer, a fuel cell and an electrical energy storage constituting the fuel cell system are installed under the floor of the vehicle in their order as viewed longitudinally of its body. Thus, the components of the fuel cell system are arranged in accordance with its progression. This arrangement enables the shortening of piping and electrical wiring interconnecting the components.

2 Claims, 5 Drawing Sheets

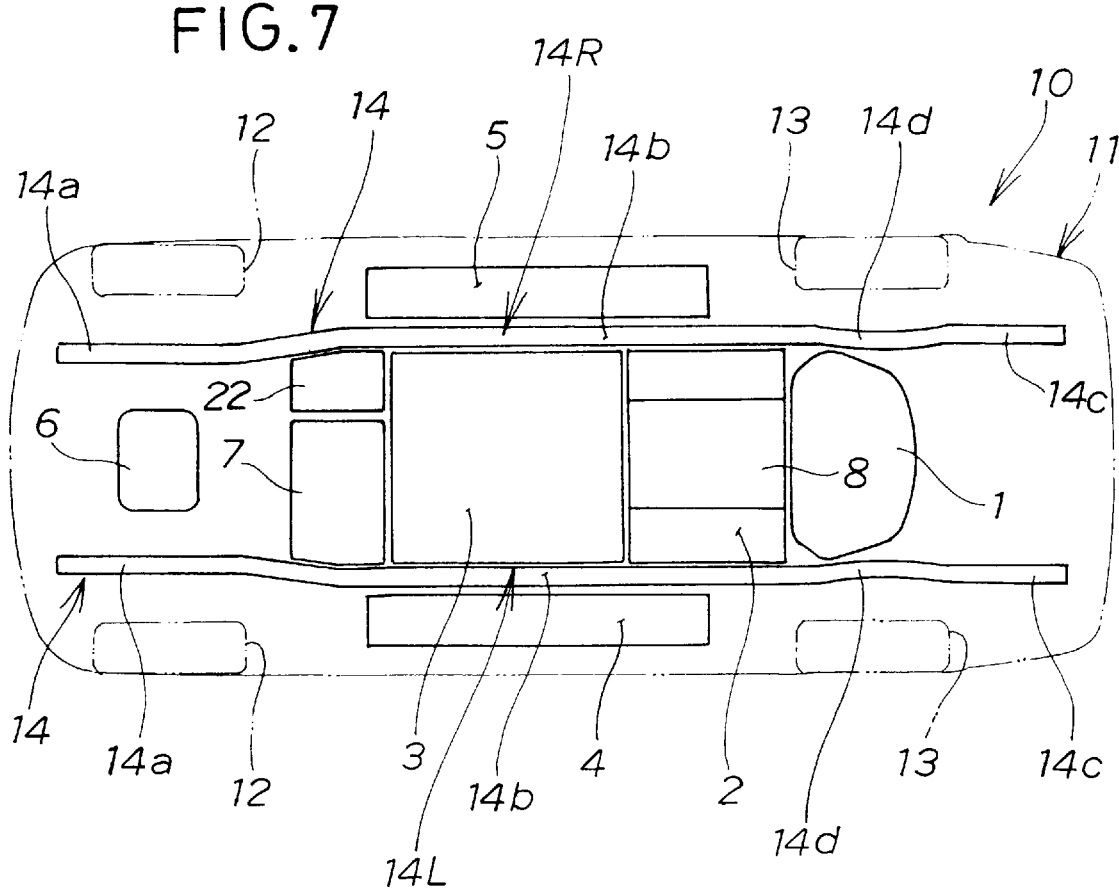

FUEL-CELL-POWERED ELECTRIC AUTOMOBILE

BACKGROUND OF THE INVENTION

1. Field of the Invention

This invention relates to an electric automobile having fuel cell as its power source, and more particularly, to an arrangement of a fuel tank, a fuel reformer, a fuel cell and an electrical energy storage which constitute a fuel cell system.

2. Description of the Related Art

A fuel cell is well known in the art, and an electric automobile having a fuel cell as its power source is known from, for example, Japanese Patent Laid-Open Publication No. HEI-3-109126 or U.S. Pat. No. 5,641,031.

The fuel-cell-powered electric automobile disclosed in Japanese Patent Laid-Open Publication No. HEI-3-109126 is a small electric automobile for a very small number of passengers, such as two, and has a fuel cell mounted in the vicinity of the center of gravity of its body. This electric automobile has, however, a narrow space in its passenger compartment, since the reformer, fuel cell and other batteries are installed on the frame of its body and these devices are situated in its passenger compartment. This arrangement of devices is undesirable for an automobile for four or five or more passengers, since it has a narrow passenger compartment.

The fuel-cell-powered electric vehicle disclosed in U.S. Pat. No. 5,641,031 is of the type not having any electrical energy storage. According to one example, the reformer and fuel tank constituting the fuel cell system are installed within the loading compartment in the rear region of the vehicle, but this arrangement has the drawback of narrowing the loading compartment. Shown as another example is an electric vehicle having a fuel tank mounted in its front region, a reformer mounted in its rear region, and a fuel cell mounted between the fuel tank and the reformer. According to this other example, however, the interconnection of the devices requires complicated piping, and the arrangement of the devices does not provide any efficient flow through the fuel cell system, but needs improvement.

SUMMARY OF THE INVENTION

It is therefore an object of this invention to provide a fuel-cell-powered electric automobile for four or five or more passengers which makes it possible to realize an efficient arrangement of the components of its fuel cell system without narrowing the space in its passenger or loading compartment.

It is another object of this invention to provide a fuel-cell-powered electric automobile which makes it possible to realize an efficient arrangement of a distributor for distributing electric power generated by a fuel cell to an electrical energy storage and a motor in a fuel cell system, and an arrangement of its components which is beneficial for shortening their electrical wiring and simplifying the fabrication of the automobile including electrical wiring.

According to an aspect of this invention, there is provided a fuel-cell-powered electric automobile having a fuel cell as its power source, characterized in that a fuel tank, a fuel reformer, the fuel cell and an electrical energy storage are installed under its floor in their order as viewed longitudinally of its body.

According to this invention, therefore, the components of a fuel cell system including the fuel tank, reformer, fuel cell and electrical energy storage are arranged in the automobile body in accordance with progression through the system. Therefore, it is possible to shorten the piping and electrical wiring interconnecting the components, simplify the construction of the fuel-cell-powered electric automobile, facilitate its piping and wiring, and achieve an efficient arrangement of its fuel cell system.

Moreover, the components of the fuel cell system installed under the floor of the automobile body do not narrow the space in the automobile or its trunk compartment. Thus, the automobile and its trunk compartment have a broad space which is easy to use, and gives it an improved practical utility.

Moreover, the components of the fuel cell system are arranged longitudinally of the automobile in accordance with progression through the system. Therefore, the fuel cell and electrical energy storage which are greater in weight than the other components can be situated in the middle portion of the automobile, and the automobile has a good longitudinal balance of weight.

The electric automobile of this invention may further include a distributor installed in parallel to the electrical energy storage as viewed transversely of its body. Therefore, the electrical energy generated by the fuel cell can be supplied through the distributor to the motor in accordance with its load and to the electrical energy storage in accordance with the amount of energy stored therein. Moreover, the distributor is situated close to the electrical energy storage, and their electrical wiring can advantageously be shortened.

The automobile body has two longitudinally extending parallel frames which are appropriately spaced apart from each other along its width, and between which at least the reformer, fuel cell, electrical energy storage and distributor are installed.

Therefore, the frames protect the important components of the fuel cell system from any impact acting transversely upon the vehicle, and eliminate the necessity of providing any special protector for the fuel cell system or otherwise simplify the arrangement of such a protector.

A condenser is mounted on the top of the reformer for converting water vapor from the fuel cell to water. This arrangement allows water to enter the reformer by its own weight from the fuel cell, and eliminates the necessity of installing any special pump. etc. for supplying water to the reformer.

BRIEF DESCRIPTION OF THE DRAWINGS

Several preferred embodiments of this invention will now be described in detail, by way of example only, with reference to the accompanying drawings, in which:

FIG. 7 is a top plan view of the automobile showing the arrangement of the components of the fuel cell system in a second embodiment shown in FIG. 6, with a motor installed in the front portion of the automobile.

DETAILED DESCRIPTION OF THE PREFERRED EMBODIMENTS

The following description is merely exemplary in nature and is in no way intended to limit the invention, its application or uses.

Figure 1:
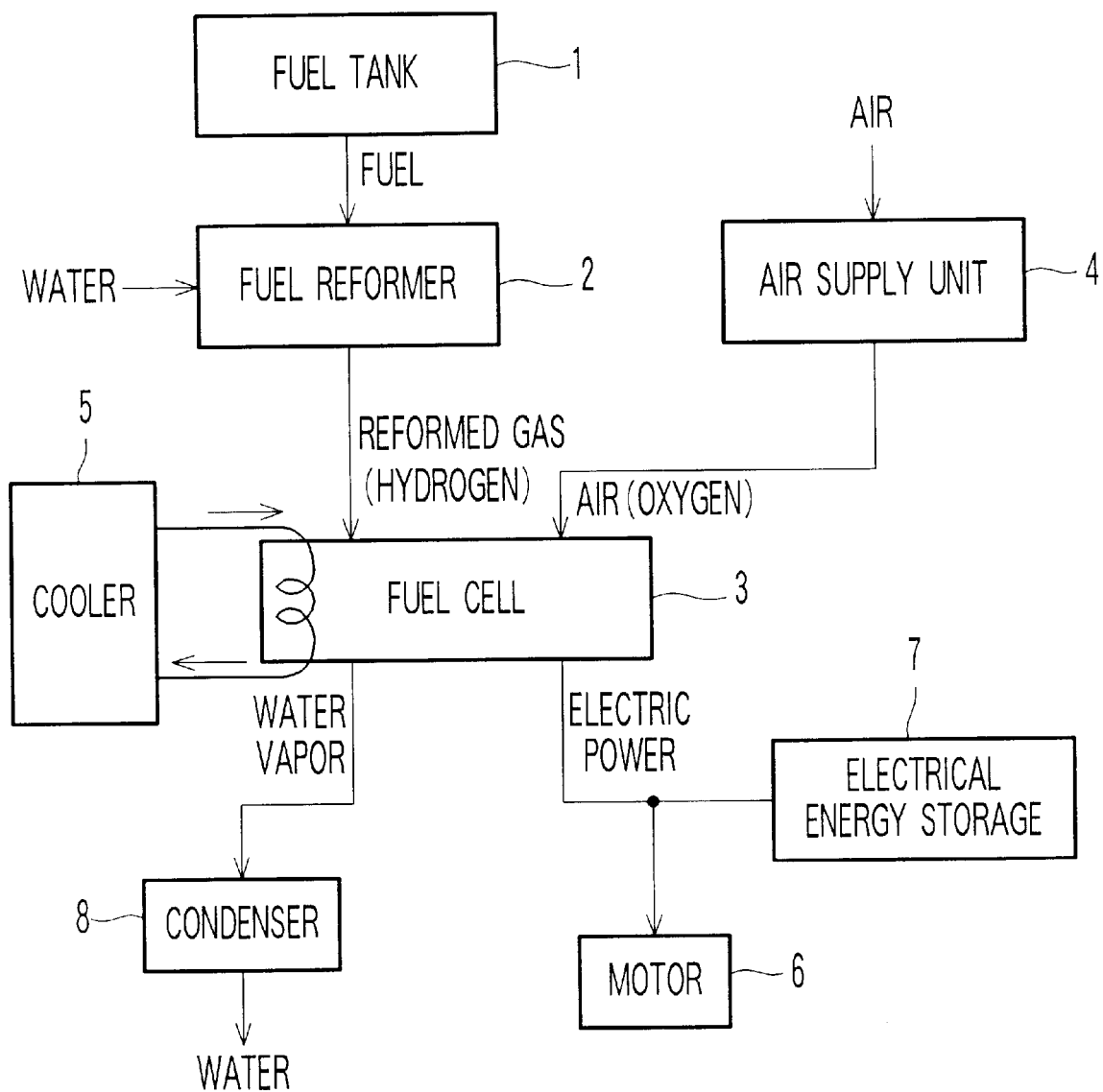
FIG. 1 is a flowchart showing progression through a fuel cell system in a fuel-cell-powered electric automobile according to a first embodiment of this invention.

FIG. 1 is a block diagram of the fuel cell system in a fuel-cell-powered electric automobile according to a first embodiment of this invention. The fuel cell system for a fuel-cell-powered electric automobile is known, and will be described briefly with reference to FIG. 1.

1 is a fuel tank containing, for example, methanol as fuel, and 2 is a fuel reformer which heats a reactant material, such as a mixture of fuel from the fuel tank and water, thereby reforms it into a reformed gas consisting mainly of hydrogen and supplies it to a fuel cell 3.

The fuel cell 3 is supplied with air (oxygen) from an air supply unit 4, as well as with the reformed gas, and the reformed gas reacts with air (oxygen) to produce water (water vapor), while electricity is generated as is already known. The fuel cell 3 is equipped with a cooler 5.

The electricity generated by the fuel cell 3 is supplied to a motor 6 as a source of motive power for an electric automobile for driving the motor 6 to cause the automobile to run. The electricity generated by the fuel cell 3 is also stored in an electrical energy storage 7. The electrical energy storage 7 supplies electricity to the motor 6 in accordance with the operating conditions of the automobile. The electrical energy storage 7 may, for example, be a secondary battery, or electrical double-layer capacitor.

The water vapor produced and discharged by the fuel battery 3 is condensed by a condenser 8 into water, which water is supplied to the fuel reformer 2.

Although methanol has been mentioned as an example of fuel, it is also possible to use gasoline.

Figure 2:
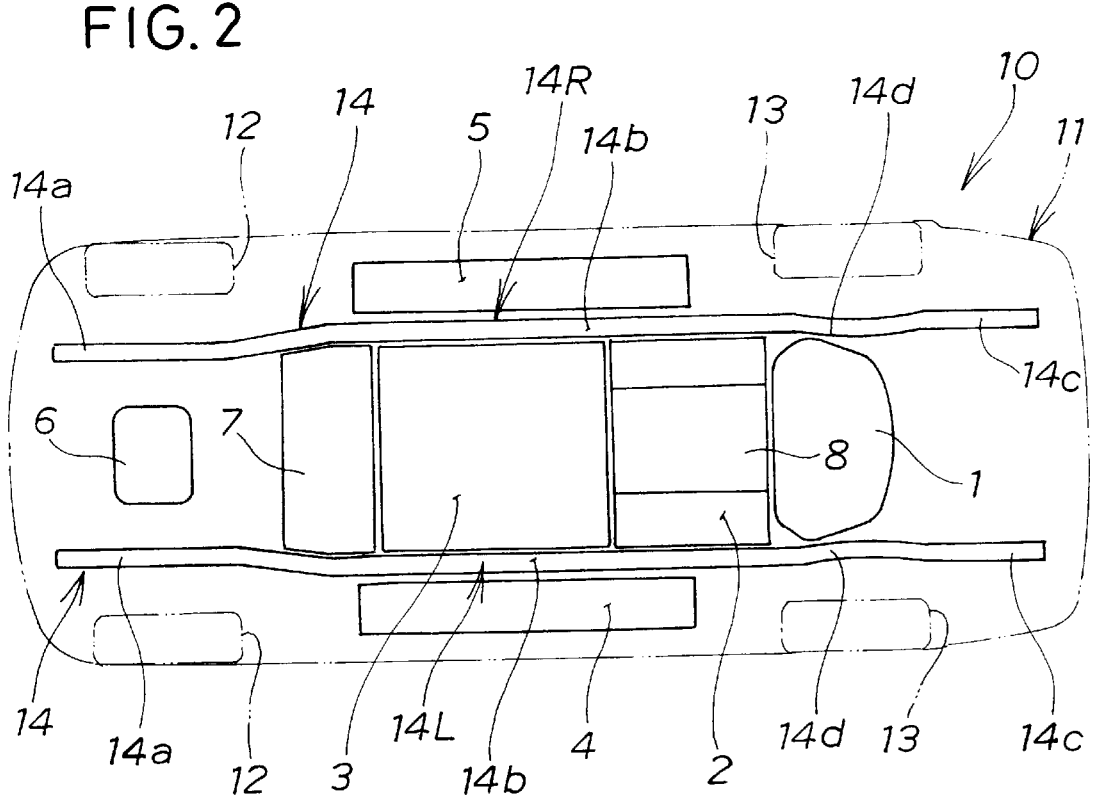
FIG. 2 is a top plan view of the automobile showing the arrangement of the components of the fuel cell system shown in FIG. 1, with a motor installed in the front portion of the automobile.
Figure 3:
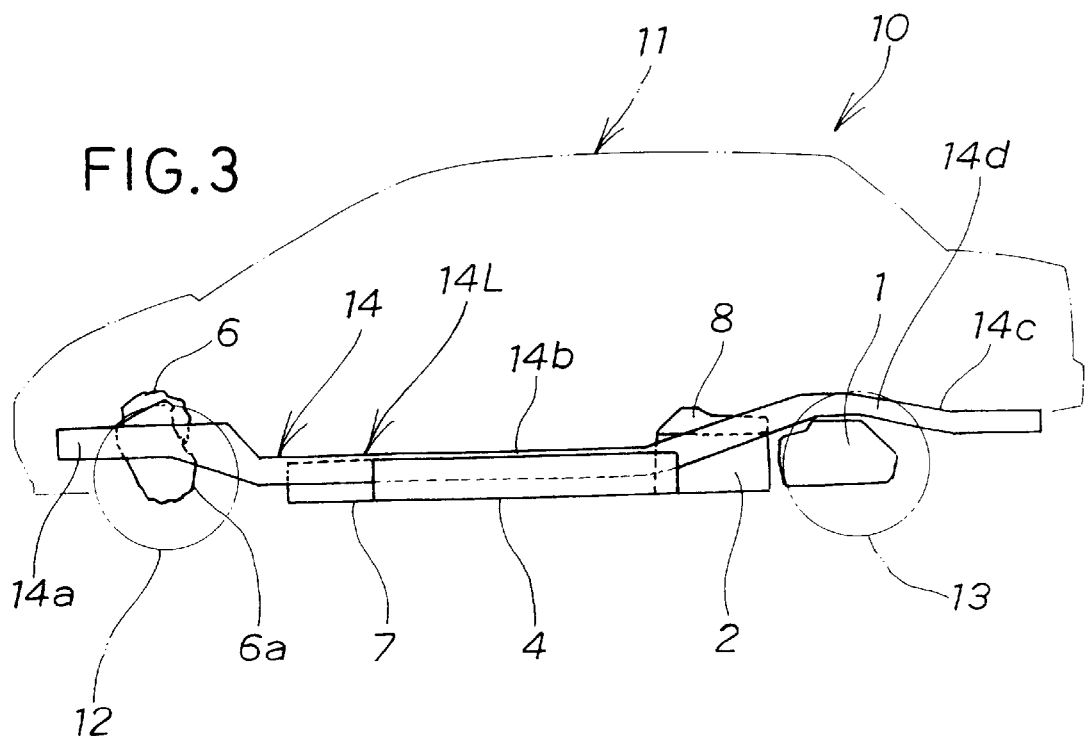
FIG. 3 is a side elevational view of the automobile shown in FIG. 2.

FIGS. 2 and 3 are a top plan view showing by way of example an arrangement of the components of the fuel cell system shown in FIG. 1, with an electric automobile having a motor installed in its front portion.

The electric automobile 10 shown in FIG. 2 is a four-wheeled vehicle having a pair of front wheels 12 and a pair of rear wheels 13.

An automobile body 11 shown by a two-dot chain line has two longitudinally extending frames 14 spaced apart from each other along the width of the vehicle.

The two frames 14 lie in a parallel and transversely spaced apart relation to each other. Each of the frames 14 as shown is composed of a front portion 14a, a middle portion 14b and a rear portion 14c. The middle portions 14b are situated substantially between the front wheels 12 and the rear wheels 13. The front portions 14a have therebetween a spacing which is somewhat smaller than that between the middle portions 14b. The rear portions 14c have inwardly curved portions 14d which are contiguous to the middle portions 14b, respectively, and have therebetween a spacing which is smaller than that between the middle portions 14b.

The components of the fuel cell system which have been described before with reference to FIG. 1 are installed longitudinally of the automobile 10 as described.

The fuel tank 1 is first installed in the rear portion of the automobile body 11. More specifically, the fuel tank 1 is installed between the inwardly curved rear portions 14d of the frames 14. The fuel reformer 2 is installed forwardly of, and adjacent to the fuel tank 1. The condenser 8 is installed on the top of the reformer 2, as shown in FIG. 3.

The fuel cell 3 is installed forwardly of, and adjacent to the fuel reformer 2. The electrical energy storage 7 is installed forwardly of, and adjacent to the fuel cell 3.

The motor 6 is installed between the front portions 14a where the frames 14 have a smaller spacing therebetween. The motor 6 is installed in the front portion of the automobile body 11 forwardly of the electrical energy storage 7. A transmission 6a is connected to the motor 6, as shown in FIG. 3. The transmission 6a is connected to the front wheels 12 by a drive shaft (not shown).

The fuel reformer 2 carrying the condenser 8 on its top, the fuel cell 3 and the electrical energy storage 7 are installed between the middle portions 14b of the frames 14, as described. They are arranged in the order of the reformer 2, fuel cell 3 and electrical energy storage 7 as viewed from the rear portion of the automobile body 11 to its front portion.

The cooler 5 forming a cooling system for the fuel cell 3 is installed on the right-hand side of the fuel cell 3 and outwardly of the right frame 14R. The air supply unit 4 forming an air intake system for the fuel cell 3 is situated on the left-hand side of the fuel cell 3 and outwardly of the left frame 14L.

The front portions 14a of the frames 14 are at a somewhat higher level than the middle portions 14b are, as shown in FIG. 3. The rear portions 14c are also at a somewhat higher level than the middle portions 14b are. The inwardly curved portions 14d of the rear portions 14c are somewhat curved upwardly, too.

Figure 4:
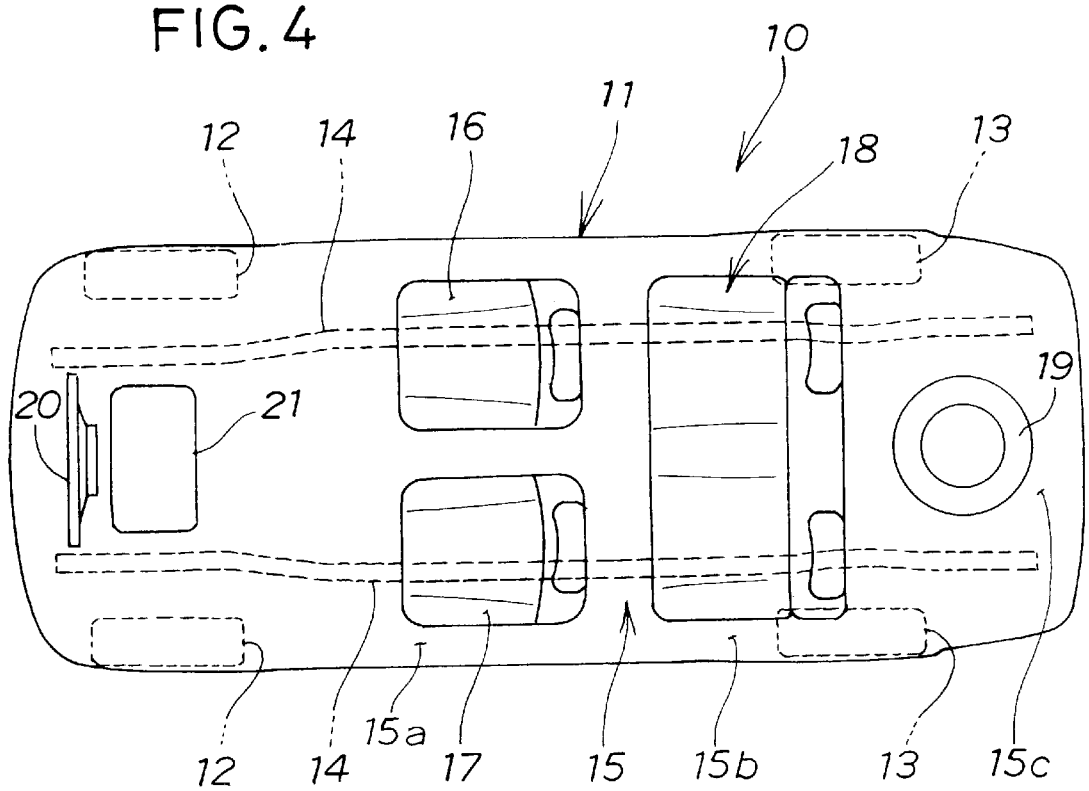
FIG. 4 is a top plan view of the automobile showing a layout of seats.
Figure 5:
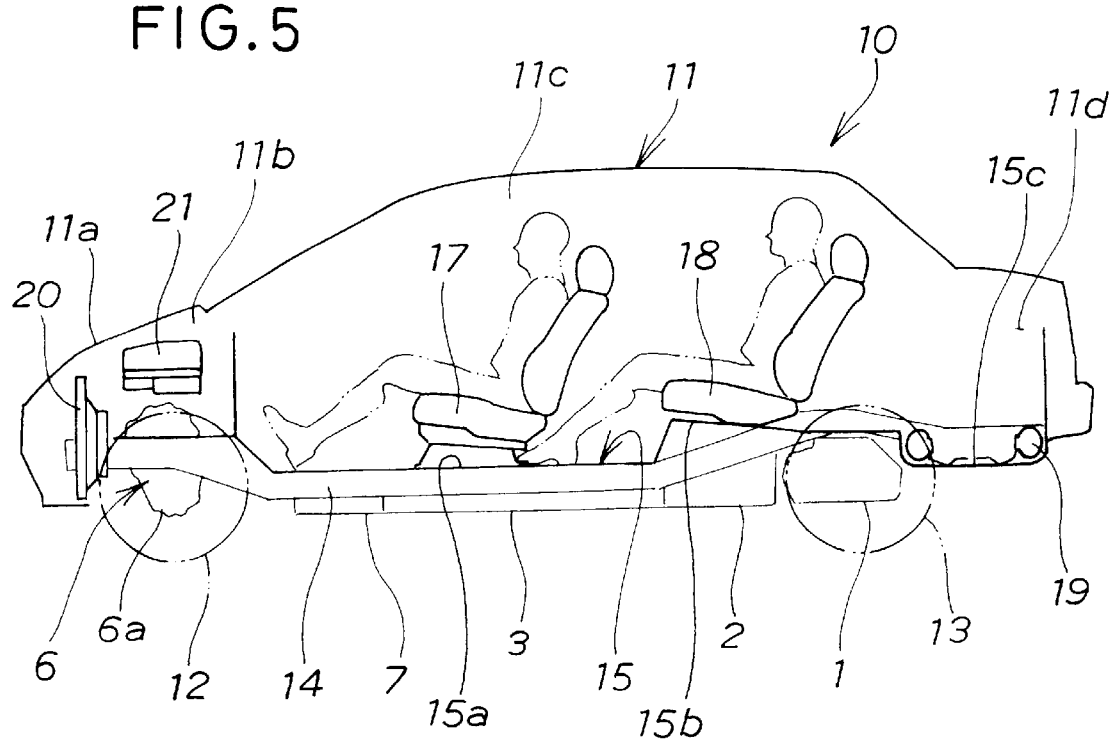
FIG. 5 is a side elevational view of the automobile shown in FIG. 4.

FIGS. 4 and 5 show a layout of seats in the vehicle.

The two frames 14 are situated under the floor 15 of the automobile body 11.

A pair of transversely spaced apart front seats 16 and 17 are mounted on a floor portion 15a above the fuel cell 3. A rear seat 18 is mounted on a floor portion 15b situated backwardly of the floor portion 15a, or above the fuel reformer 2. A spare tire 19 is kept in a trunk compartment 11d defined above a floor portion 15c at the rear end of the automobile.

A radiator 20 for cooling the motor 6 is installed between the front ends of the frames 14 in the front portion of the automobile body 11. A power control unit (PCU) 21 for controlling the motor and the fuel cell system is mounted above the motor 6 including the transmission 6a.

The radiator 20, the motor 6 including the transmission 6a and the power control unit 21 are situated in a motor room 11b closed by a bonnet 11a in the front portion of the automobile body 11, as shown in FIG. 5.

The fuel cell 3 is situated below the front seats 16 and 17 in a passenger compartment 11c, as stated before. The fuel reformer 2 and the condenser 8 mounted thereon are located below the rear seat 18. The fuel tank 1 is positioned behind the rear seat 18, between the rear wheels 13, 13 and forwardly downwardly of the trunk compartment 11d.

Although the motor 6 has been described as being situated in the front portion of the automobile, this invention is not limited to such arrangement, but the motor 6 may alternatively be situated in the rear portion of the automobile. In such a case, the fuel tank 1, fuel reformer 2, fuel cell 3 and electrical energy storage 7 are installed below the floor 15 in their order as viewed from the front portion of the automobile to its rear portion.

Figure 6:
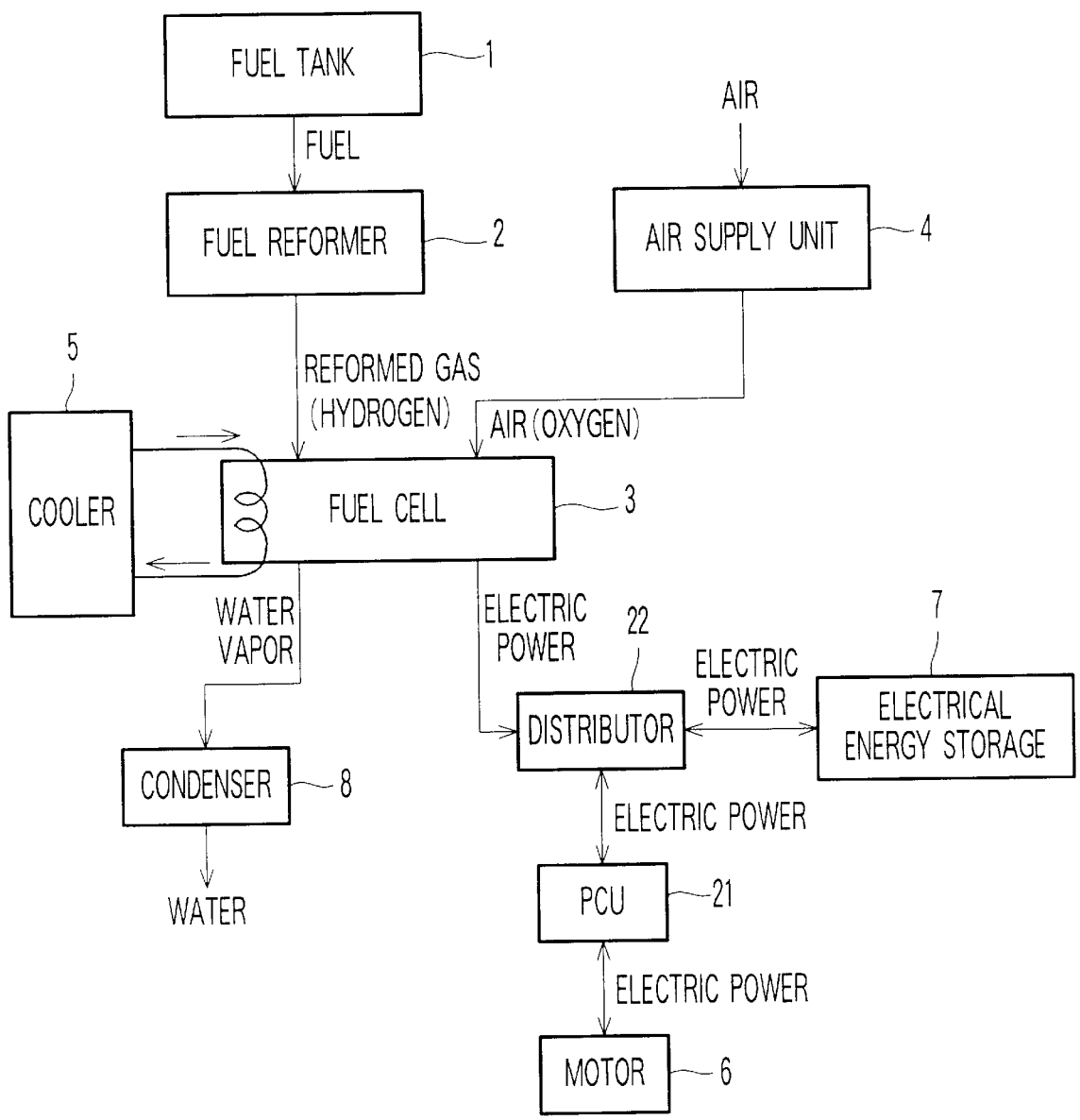
FIG. 6 is a flowchart showing progression through a fuel cell system in a fuel-cell-powered electric automobile according to a second embodiment of this invention.

FIG. 6 shows a fuel cell system for a fuel-cell-powered electric automobile according to a second embodiment of this invention. The fuel cell system is shown by a flow diagram which is basically identical to FIG. 1 showing the first embodiment, and like numerals are used to denote like elements in both of the figures, so that no detailed description thereof may be repeated.

According to this second embodiment, a distributor 22 is installed between a fuel cell 3 and an electrical energy storage 7 and a motor 6. The presence of the distributor 22 differentiates it from the fuel cell system according to the first embodiment.

The distributor 22 is provided for distributing the electric power generated by the fuel cell 3 and supplying it to the electrical energy storage 7 and the motor 6. The distributor 22 supplies the electric power generated by the fuel cell 3 to the motor 6 in accordance with its load and to the electrical energy storage 7 in accordance with the amount of power stored therein.

For a specific example, electric power is supplied from the fuel cell 3 and the electrical energy storage 7 to the motor 6 when the motor 6 has a heavy load for accelerating the vehicle.

A power control unit (PCU) 21 is installed between the distributor 22 and the motor 6. The PCU 21, for example, controls the supply of electric power from the distributor 22 to the motor 6 and the fuel cell system (air supply unit, etc.) in accordance with the operating conditions of the automobile. It also controls the supply of regenerated power from the motor 6 to the electrical energy storage when the vehicle is driven under deceleration, or braked.

FIG. 7 shows by way of example an arrangement of the fuel cell system according to the second embodiment as described above in an electric automobile.

The arrangement of the components of the fuel cell system relative to an automobile body 11 is basically identical to that according to the first embodiment as described before, and like numerals are used to denote like parts throughout the relevant figures, so that no detailed description may be repeated.

10 is an electric automobile, 11 is an automobile body, 12 are a pair of transversely spaced apart front wheels, 13 are a pair of transversely spaced apart rear wheels, and 14 are frames.

The right and left frames 14R and 14L are situated in a parallel and transversely spaced apart relation to each other, as stated in the description of the first embodiment. The fuel tank 1, fuel reformer 2, condenser 8, fuel cell 3, electrical energy storage 7 and motor 6 constituting the fuel cell system are installed between the two frames 14 in their order as viewed from the rear portion of the automobile body 11 to its front portion, as stated in the description of the first embodiment shown in FIGS. 2 and 3. The motor 6 is provided with a transmission not shown, as according to the first embodiment.

According to this second embodiment, the distributor 22 is situated on the right-hand side of the electrical energy storage 7 ahead of the fuel cell 3 in parallel and close proximity thereto.

The second embodiment is also applicable to an electric automobile having a motor 6 installed in the rear portion of its body 11, as the first embodiment is. In such a case, the fuel tank 1, fuel reformer 2, fuel cell 3, and electrical energy storage 7 including the distributor 22 installed on one side thereof are installed below the floor of the automobile body 11 in their order as viewed from its front to rear portion.

Obviously, various minor changes and modifications of the present invention are possible in the light of the above teaching. It is therefore to be understood that without the scope of the appended claims the invention may be practiced otherwise than as specifically described.

What is claimed is:

1. An electric automobile, comprising:

an automobile body having two longitudinally extending frames with means for defining between them a front portion, a middle portion, and a rear portion;

a fuel tank installed in one of the front portion and rear portion;

a fuel reformer with a condenser on top thereof, a fuel cell, and an electrical energy storage all installed in the middle portion; and an electric motor installed in one of the front portion and the rear portion;

wherein locating said fuel cell and said electrical energy storage in the middle portion provides said automobile with longitudinal weight balance and locating said condenser on said fuel reformer results in water entering said fuel reformer easily.

2. An electric automobile, comprising:

an automobile body having two longitudinally extending frames with means for defining between them a front portion, a middle portion, and a rear portion;

a fuel tank installed in one of the front portion and rear portion;

a fuel reformer, a fuel cell, and an electrical energy storage all installed in the middle portion;

a distributor installed parallel to said electrical energy storage in the middle portion of said automobile body; and an electric motor installed in one of the front portion and the rear portion;

wherein locating said fuel cell and said electrical energy storage in the middle portion provides said automobile with longitudinal weight balance and locating said distributor in the middle portion close to said electrical energy storage shortens electrical wiring and allows the frames to provide protection.

* * * * *